United States Patent Office 2,846,442
Patented Aug. 5, 1958

2,846,442

TRICHLOROMETHYL-SULPHENIC ACID ESTERS OF CYCLIC OXIMIDES AND THEIR PRODUCTION

Engelbert Kühle, Koln-Stammheim, Richard Wegler, Leverkusen, and Ferdinand Grewe, Koln-Flittard, Germany, assignors to Farbenfabriken Bayer Aktiengesellschaft, Leverkusen, Germany, a corporation of Germany No Drawing. Application April 18, 1956
Serial No. 578,867

9 Claims. (Cl. 260—326)

This invention relates to trichloromethyl-sulphenic acid esters of cyclic oximides according to the formula

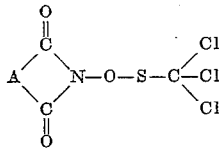

in which A is the residue of an organic dicarboxylic acid and to a process for their production.

It is an object of the present invention to provide trichloromethyl-sulphenic acid esters of cyclic oximides having fungicidal activity.

Another object of the invention is to provide a process of producing trichloromethyl-sulphenic acid esters of cyclic oximides.

Further objects will become apparent as the following description proceeds.

In the reaction of cyclic acid anhydrides with hydroxylamine there are obtained compounds which probably have the oximide structure "A." As examples of such anhydrides there may be mentioned anhydrides of phthalic acid, tetrahydrophthalic acid, endomethylene-tetrahydrophthalic acid, hexahydrophthalic acid, 2-chloro-phthalic acid, nitrophthalic acid, naphthalic acid, thiodiglycollic acid, succinic acid, dimethylmaleic acid, 2,3-pyridine-dicarboxylic acid and camphoric acid. Other possibilities for the structure of such compounds are illustrated for example by the general formulae B and C:

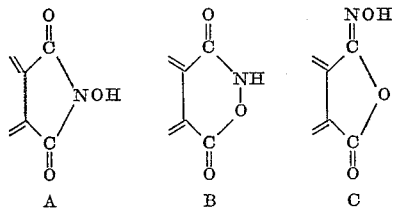

Corresponding compounds are also obtained from the dicarboxylic acids themselves or their diesters or dihalides.

In accordance with the invention it has now been found that cyclic oximides may be converted with trichloromethylsulphenic chlorides into sulphenic acid esters. The cyclic oximides which are suitable according to the present invention may be represented by the general formula:

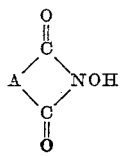

in which A is the residue of an organic dicarboxylic acid. Examples of such oximides are oximides of phthalic acid, tetrahydrophthalic acid, endomethylene - tetrahydrophthalic acid, hexahydrophthalic acid, 2-chloro-phthalic acid, nitrophthalic acid, naphthalic acid, naphthalene-1,8-dicarboxylic acid, thiodiglycollic acid, iminodiacetic acid, succinic acid, maleic acid, propane-1,3-diarboxylic acid, dimethylmaleic acid, 2,3-pyridine-dicarboxylic acid, camphoric acid and quinoline-2,3-dicarboxylic acid.

The conversion can be carried out either by reacting an alkali metal or alkaline earth metal salt or other salts of the corresponding oximide with perchloromethylmercaptan.

The reaction is preferably carried out in the presence of an inert organic solvent. Examples of such solvents are ether, benzene, xylene, toluene, anisol, hydrocarbons, chlorinated hydrocarbons like chloroform, ethylene chloride, furthermore alcohols like ethylalcohol, methylalcohol, isopropylalcohol, and acetone.

The reaction may, however, also be effected in water with tertiary amines or even with exclusion of any solvents. Besides, the process of the invention may be carried out in a suspension. In this case, suitable wetting agents may be added to promote the reaction between the suspended components. In aqueous solution there may also be used as buffers other weakly basic compounds such as sodium bicarbonate, sodium acetate or alkali metal borates or phosphates. The kind of solvents to be used depends to a great extent on the solubility of the salts of the oximide applied.

The reaction proceeds within a wide temperature range, say between about 0–150° C. It is preferably to conduct the reaction between 60 and 100° C. According to a preferred embodiment of the invention the reaction is effected in boiling benzene.

The process is illustrated by the following reaction scheme using phthaloximide as starting material:

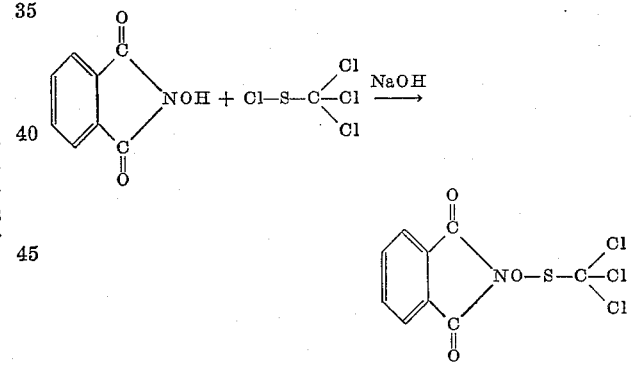

The compounds obtained by the present process have been unknown up to now. They may very widely be applied as for instance in the rubber industry or in plant protection. The fungicidal properties of these substances are particularly worth mentioning. Finally, the compounds obtained by the process according to the invention may be used as intermediate products for further chemical reactions.

The inventive compounds are especially suitable for combating fungi of the type *Phytophthora infestans* (potatoes and tomatoes), *Venturia inaequalis* (apples), *Plasmopara viticola* (vine), *Septoria apii graveolentis* (celery), and *Cladosporium fulvum* (tomatoes).

These fungi which may be controlled by the inventive substances are given only by way of example. It is to be understood that the trichloromethylsulphenic acid esters of cyclic oximides may be applied against a wide variety of fungi.

The inventive compounds may be applied in suitable liquid or solid solvents, diluents or extenders respectively. As liquid solvents there may be mentioned e. g. alcohols, lower aliphatic ketones or water. In the latter case, the addition of suitable emulsifiers is advisable. Suitable solid extenders or carriers are inert materials, such as kaolin, bentonite, chalk, silica, talcum, etc. If the active ingredients are to be applied in the form of slurries suitable emulsifiers should preferably be added to the carrier.

The content of the inventive trichloroethylsulphenic acid esters of cyclic oximides in the above-mentioned liquid or solid solvents, diluents, or extenders, which are to be employed in practice, should be within the range of 0.01–2 percent of active substance. In most cases (potatoes, tomatoes, beets) an amount of 100 g. to 10 kg. of active substances per hectare are to be used to efficiently combat fungi. In a specific case, the amount of active ingredients depends on the gravity of the attack by fungi.

This application is a continuation-in-part of our copending application Serial No. 558,424, now abandoned.

The following examples are given for the purpose of illustrating the invention but are not intended to limit same in any way.

Example 1

The reaction mixture of 40.2 grams of the sodium salt of 3,6-endomethylene-$\Delta^4$-tetrahydrophthaloximide and 37.2 grams of perchloromethylmercaptan is heated in 250 millilitres of boiling benzene for three hours, and the hot solution is subsequently filtered off by suction from common salt. The filtrate is concentrated in vacuum and the residue treated with petroleum ether; a slowly crystallizing oil separates out. It is filtered off by suction and washed with methanol. The trichloromethyl-sulphenic esters of 3,6-endomethylene-$\Delta^4$-tetrahydrophthaloximide melts at 134° C. (with decomposition).

$C_{10}H_8O_3NSCl_3$ (328.5): Calculated: N, 4.26%; S, 9.75%. Found: N, 4.25%; S, 9.75%.

Example 2

Into a 500 ml.-three-neck-flask provided with stirrer, reflux condenser and drop-funnel, a suspension of 43 grams of red-coloured phthaloximide sodium salt in 150 millilitres of absolute benzene is placed. 40 grams of perchloromethylmercaptan are slowly added drop by drop to the boiling suspension and the reaction solution is heated until the red colour has completely disappeared, say after about 30 minutes. The hot solution is filtered off by suction from common salt, and the trichloromethylsulphene ester of phthaloximide is obtained from the filtrate along with unreacted perchloromethylmercaptan. M. P. 179° C. (from acetic ester).

$C_9H_4O_3NSCl_3$ (312.5): Calculated: N, 4.48%; S, 10.24%. Found: N, 5.15%; S, 11.31%.

Example 3

A mixture of 44 grams of the sodium salt of $\Delta^4$-tetrahydrophthaloximide and 30 grams of perchloromethylmercaptan in 150 millilitres of benzene is boiled for one hour, the hot solution is filtered off by suction from common salt and the filtrate is concentrated in vacuo. The residual oily conversion product is contaminated by small quantities of $\Delta^4$-tetrahydrophthaloximide.

Example 4

224 grams of the sodium salt of succinic oximide are suspended in 80 millilitres of boiling benzene and 37.2 grams of perchloro-methyl-mercaptan are added dropwise. The reaction mixture is stirred for another 15 minutes and the hot mixture is filtered off from common salt. The filtrate is concentrated in vacuum and the residue crystallized from ethyl acetate. The reaction product is the trichloro-methyl-sulphene ester of succinic oximide of the M. P. 147° C. (with decomposition).

Example 5

48 grams of the sodium salt of hexahydrophthaloximide are suspended in 200 millitres of boiling benzene and 40 grams of perchloromethylmercaptan are dropped into the reaction solution within 45 minutes. After stirring for a short time the cold solution is mixed with water, the benzene layer separated off and concentrated after drying over $Na_2SO_4$. The trichloro-methyl-sulphene ester is obtained as an oily residue.

Example 6

135 grams of the sodium salt of naphthaloximide are stirred in 100 millitres of benzene and 10 grams of perchloromethylmercaptan are added slowly at boiling temperature. The mixture is stirred for another 15 minutes and the hot solution is filtered off with suction from common salt. The filtrate is concentrated in vacuum. The trichloro-methyl-sulphene ester of naphthaloximide is thus obtained.

We claim:

1. Process for the production of trichloromethylsulphenic acid esters of cyclic oximides, which comprises reacting cyclic oximides of the general formula

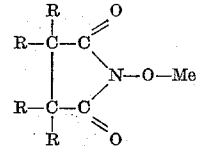

in which R is a member of the group consisting of hydrogen and, when taken together, are the atoms necessary to form the phthalyl, naphthyl, endomethylene-phthalyl radicals, the hydrogenated forms of these radicals and the nitro and chloro phthalyl radicals; and Me is a member of the group consisting of alkali and alkali earth metals with perchloromethylmercaptan.

2. Process as claimed in claim 1 wherein the reaction is carried out in the presence of an organic solvent at a temperature between 0 and 150° C.

3. Process as claimed in claim 1 wherein the reaction is carried out in the presence of an organic solvent at a temperature between 60 and 100° C.

4. Trichloromethylsulphenic acid esters of cyclic oximides of the general formula

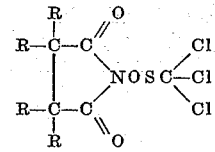

in which R is a member of the group consisting of hydrogen and, when taken together, are the atoms necessary to form the phthalyl, naphthyl, endomethylene-phthalyl radicals, the hydrogenated forms of these radicals and the nitro and chloro phthalyl radicals.

5. The trichloromethyl-sulphenic ester of 3,6-endomethylene-$\Delta^4$-tetrahydrophthaloximide.

6. The trichloromethylsulphene ester of phtaloximide.

7. The trichloromethyl-sulphene ester of $\Delta^4$-tetrahydrophthaloximide.

8. The trichloromethylsulphene ester of hexahydrophthaloximide.

9. The trichloromethylsulphene ester of naphthaloximide.

References Cited in the file of this patent

UNITED STATES PATENTS

| | | |
|---|---|---|
| 2,352,516 | Bruson | June 27, 1944 |
| 2,653,155 | Kittleson | Sept. 22, 1953 |